J. B. HADAWAY.
WELT REINFORCING MACHINE.
APPLICATION FILED MAR. 30, 1900. RENEWED MAR. 2, 1910.
971,674.
Patented Oct. 4, 1910.
5 SHEETS—SHEET 3.
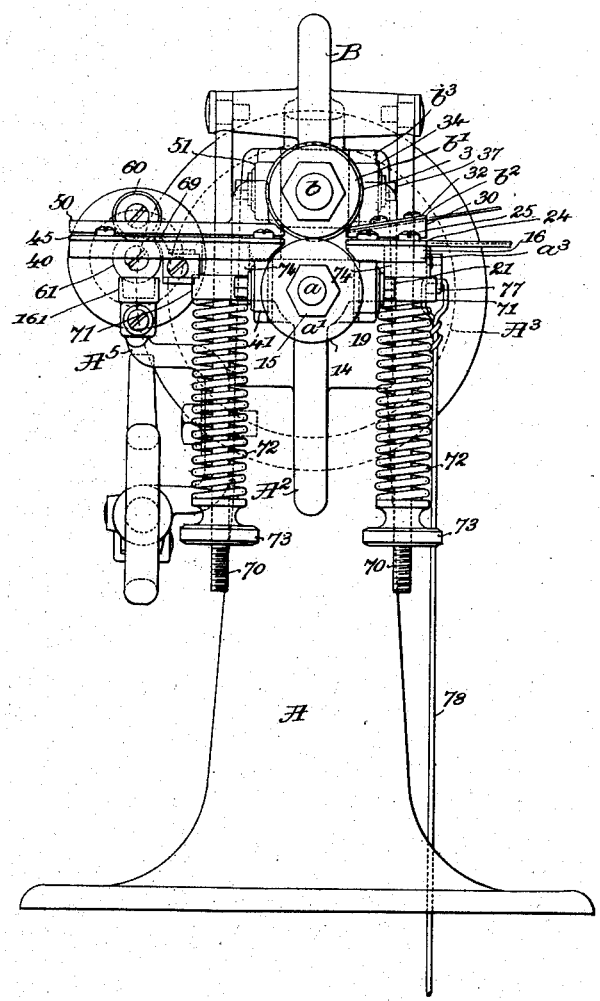

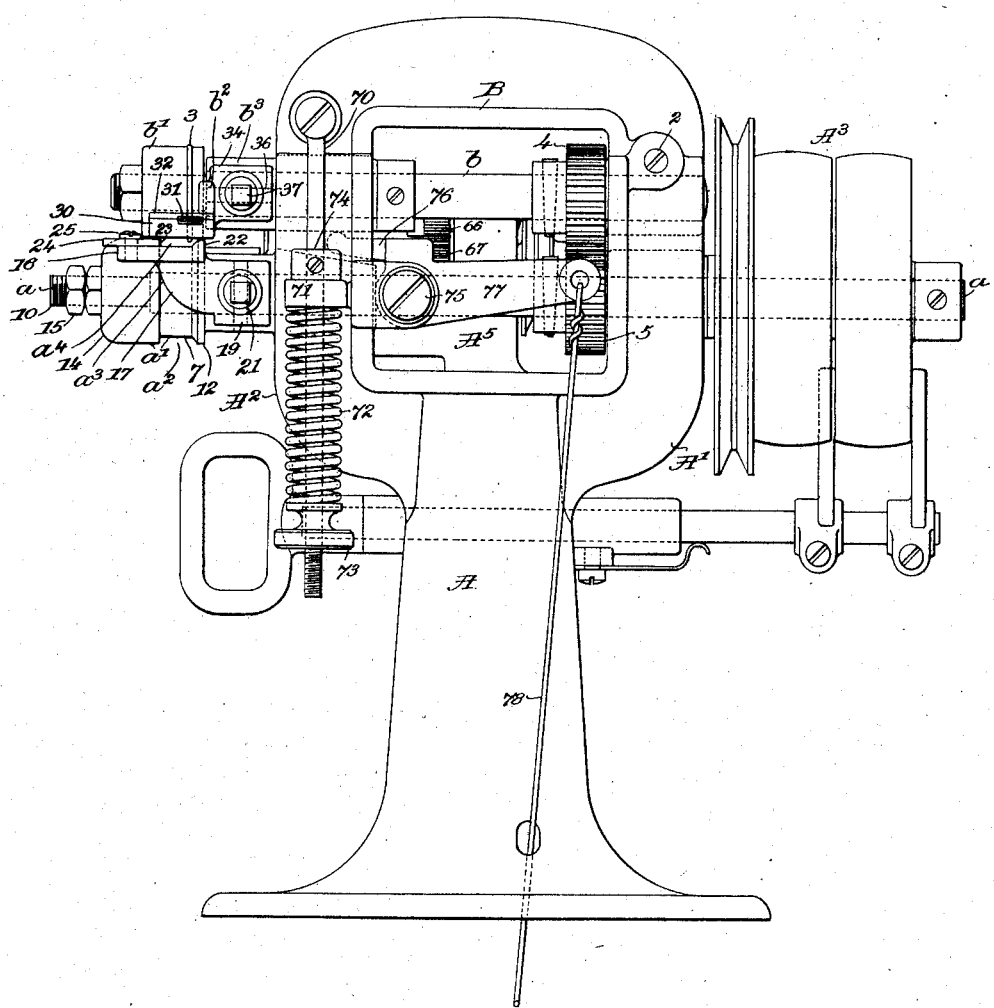

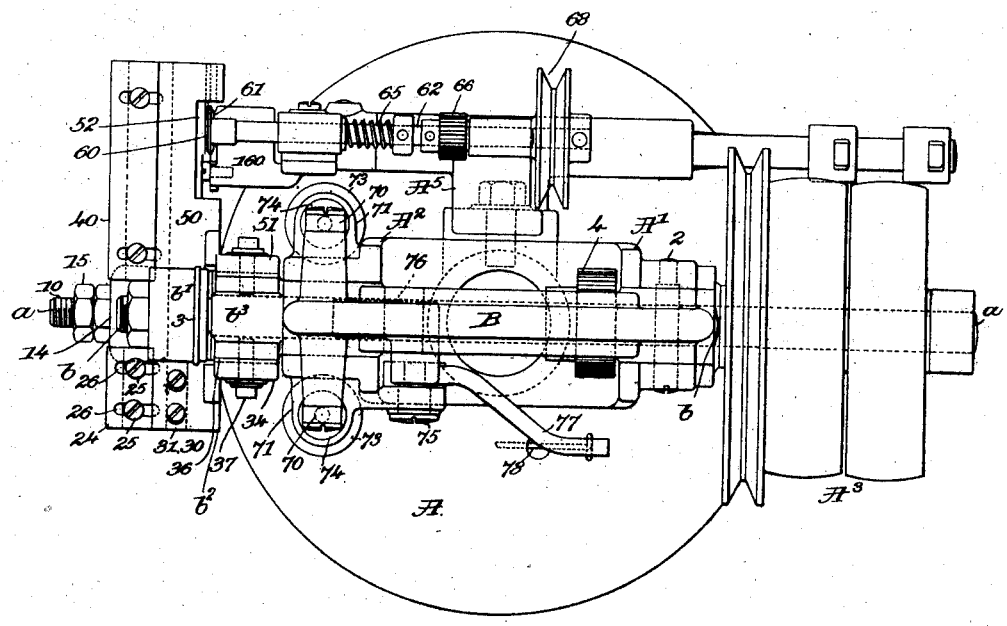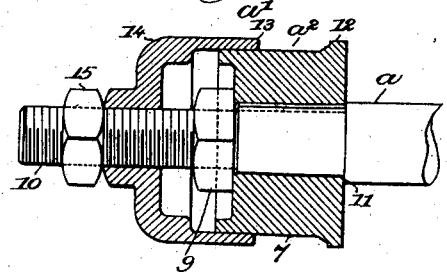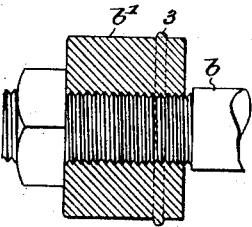

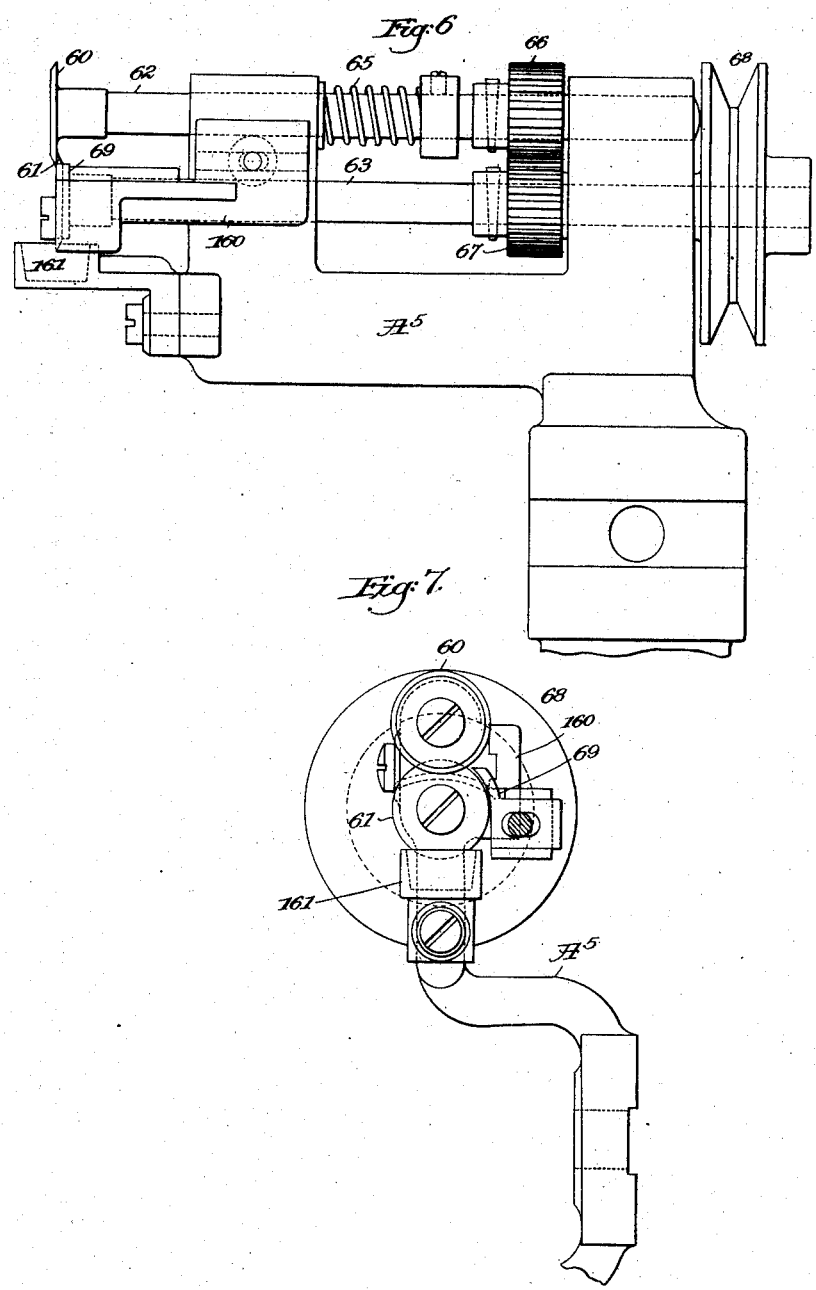

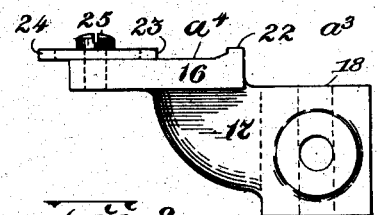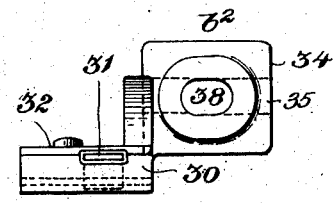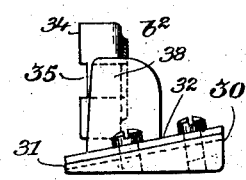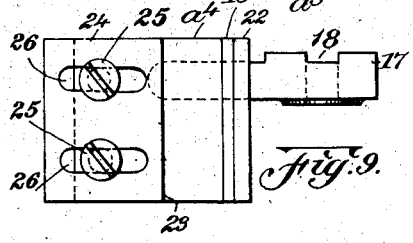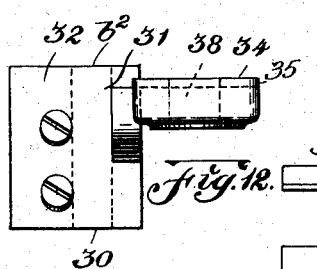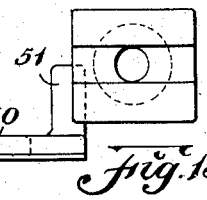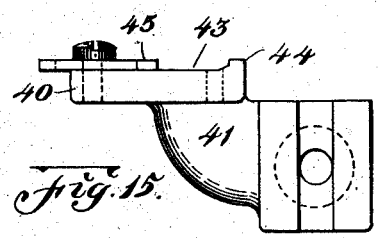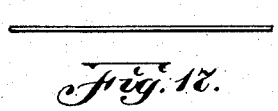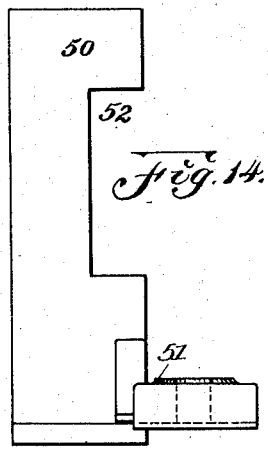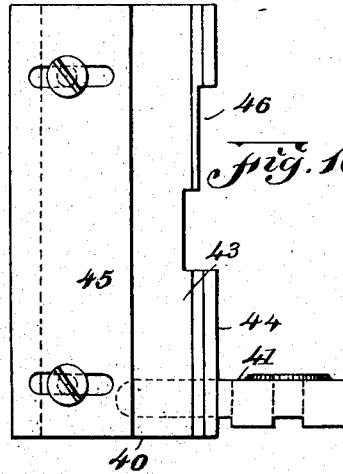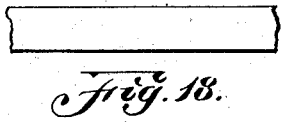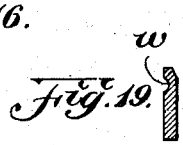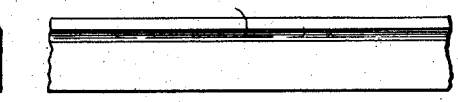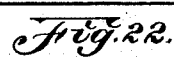

UNITED STATES PATENT OFFICE.

JOHN B. HADAWAY, OF BROCKTON, MASSACHUSETTS, ASSIGNOR TO UNITED SHOE MACHINERY COMPANY, OF PATERSON, NEW JERSEY, A CORPORATION OF NEW JERSEY.

WELT-REINFORCING MACHINE.

971,674.   Specification of Letters Patent.   Patented Oct. 4, 1910.

Application filed March 30, 1900, Serial No. 10,812. Renewed March 2, 1910. Serial No. 546,765.

*To all whom it may concern:*

Be it known that I, JOHN B. HADAWAY, a citizen of the United States, residing at Brockton, in the county of Plymouth and State of Massachusetts, have invented certain new and useful Improvements in Welt-Reinforcing Machines; and I do hereby declare the following to be a full, clear, and exact description of the invention, such as will enable others skilled in the art to which it appertains to make and use the same.

The present invention relates to improvements in machines for applying a reinforcing covering or strip to the welting used in the manufacture of boots and shoes, and more particularly to a machine for the manufacture of the improved welting shown and described in Letters Patent of the United States No. 637,948, issued to Charles S. Smith and myself November 28th, 1899.

To the above ends my invention consists in the devices and combinations of devices hereinafter described and particularly defined in the claims.

The preferred embodiment of the present invention is illustrated in the accompanying drawings in which—

Figure 1 is a side elevation, Fig. 2 is a plan view, Fig. 3 is a front view, Fig. 4 is a sectional detail of the welt supporting roll, Fig. 5 is a sectional detail of the presser roll which in the illustrated embodiment of my invention coöperates with the welt supporting roll to form the mechanism for uniting the welt and reinforcing material, Fig. 6 is a side elevation of the trimming mechanism for trimming off any surplus reinforcing material, Fig. 7 is an end view of same, Figs. 8 and 9 are respectively an elevation and plan of the welt guide detached, Figs. 10, 11 and 12 are respectively a side elevation, end view and plan of the guide for the reinforcing material, Figs. 13, 14, 15 and 16 illustrate in elevation and plan the means for supporting the united welt and reinforcing material and guiding it to the cutters. Figs. 17, 18, 19, 20, 21 and 22 illustrate the reinforcing material and welt separately, and as united in the finished product.

In the drawings the frame of the machine comprises a central standard A, having the upwardly extending arms $A^1$ $A^2$ which are bifurcated at their upper ends to receive the movable head B (see Fig. 2). The head B is preferably yoke-shaped and is mounted upon a short shaft 2 secured in one of the arms $A^1$ which project from the standard A. The head B is free to tip on said shaft 2, so that its front end can be raised and lowered, being guided in its movement by the arm $A^2$, to the bifurcation in which it is fitted and which prevents any lateral displacement thereof.

The head B carries a shaft $b$, free to rotate in suitable bearings therein. On the shaft $b$ is mounted the presser roll $b^1$ arranged to rotate with said shaft, and which coöperates with the welt supporting roll hereinafter described to form the uniting mechanism. The presser roll $b^1$ is preferably provided with an annular projection or rib 3, which forces the reinforcing material into the groove $w$ (see Figs. 19 and 20) on the welt.

In the machine of the drawings the end of shaft $b$ is threaded and the roll $b^1$ bored out and provided with mating threads so that it can be turned on to the end of shaft $b$ and the thread portion of shaft $b$ is made long enough to provide for a longitudinal adjustment of the roll $b^1$ to insure the engagement of the groove in the welt by the rib 3 (see Fig. 5).

The welt supporting roll $a^1$ is carried by and rotates with a shaft $a$ having suitable bearings in the arms $A^2$, $A^1$ and to which power is applied by the fast and loose pulley $A^3$ or other suitable device. The shafts $a$ and $b$ are made to rotate together in opposite directions by means of the mating gears 4 and 5 carried respectively thereby. The welt supporting roll $a^1$ is preferably provided with a welt receiving groove $a^2$ which, in the machine of the drawing, may be adjusted to receive varying widths of welt. The construction of the welt supporting roll $a^1$ is best shown in Fig. 4 and, as there shown, comprises a cylindrical body portion 7, centrally bored and fitted to a reduced portion of the shaft $a$ and splined thereto so as to rotate therewith. The body portion 7 is held in place by means of a nut 9 which is screwed on to a threaded portion 10 of the shaft $a$ and holds the body portion 7 against a shoulder 11 on said shaft. Upon the body portion 7 is an annular flange 12 which forms the inner wall of the groove $a^2$, that is to say the wall toward the machine. The outer wall of the groove $a^2$ is formed by the edge 13 of the cup-shaped guard 14 which is fitted over the outer end of the body portion 7. The back of the cup-shaped guard 14 is centrally bored and provided with mating threads so that it can be screwed onto the threaded end 10 of the shaft $a$. A check nut 15 is provided to hold the guard 14 in position, the arrangement being such that by turning the guard 14 on the shaft $a$ its edge 13 may be set at any required distance from the shoulder 12 to adjust the width of the groove $a^2$ for varying widths of welt, and the nut 15 may then be set to hold the guard 14 in its adjusted position.

It will of course be understood from the description of the machine of the drawing that the welt enters at one side of the pressing and supporting rolls and passing between them, emerges from the other side. On the side at which the welt enters is located what I have termed the guiding mechanism, which guides the welt into the groove in the welt support and presents the reinforcing material between the rolls in the proper position to be united to the welt by the action thereof.

In the machine of the drawing the mechanism last referred to consists of a welt guide $a^3$ and a tape guide $b^2$. It may be stated in this connection that the reinforcing material to which the machine of the drawings is adapted most conveniently consists of a tape, preferably of some textile material of less width than the welt (see Figs. 23 and 24) and of indefinite length, and which is drawn from some convenient source of supply by the action of the rolls.

The welt guide $a^3$ is illustrated in detail in Figs. 8 and 9 and as shown consists of a table 16 secured to or made integral with a bracket 17 which is secured to the arm $A^2$. The bracket 17 is preferably provided with a vertical groove 18 which engages with a vertical gib 19 upon the arm $A^2$, the bracket 17 being held in position by a clamping screw 21. The welt guide $a^3$ is preferably provided with a welt receiving groove $a^4$ conveniently formed as follows:—At the back of the table 16 is formed the straight flange 22 which forms the inner or rear wall of the groove, the front or outer wall being formed by the edge 23 of the plate 24 which is secured by the bolts 25 to the table 16. The bolt holes 26 in the plate 24, through which the bolts 25 pass, are made elongated so that the edges 23 of the plate 24 may be set at the required distance from the flange 22 to make the groove $a^4$ of the required width to receive and properly guide the welt to be operated upon. The bottom of the groove $a^4$ is at the level of the bottom of the groove $a^2$ in the welt supporting roll $a^1$ and said grooves are in line with each other.

The tape guide of the machine of the drawings is shown in detail in Figs. 10, 11 and 12 and comprises a block 30 in which is formed a tape groove 31 covered by a covering plate 32 suitably secured to said block. The inner wall of the tape groove 31 is in the vertical plane of the inner wall of the welt groove $a^4$, and the bottom of the tape groove is inclined to the bottom of the welt groove $a^4$ (see Fig. 3). The lower surface of the block 30 is parallel with the upper surface of the table 16 and is arranged to rest upon the upper surface of the welt to keep it in the groove $a^4$. The block 30 is carried on a bracket 34 secured to a forwardly projecting extension $b^3$ on the head B. The bracket 34 is provided with a horizontal groove 35 which engages a horizontal gib 36 on the extension $b^3$, so that the block 30 may be adjusted laterally to properly position the tape receiving groove 31 with reference to the welt receiving groove $a^4$. The block 30 may be clamped in the required position by means of the clamping screw 37, which passes through the elongated bolt hole 38 in the bracket 34 into a suitable bearing in the extension $b^3$.

In the machine of the drawings I have provided a trimming mechanism to trim off any portion of the reinforcing tape which may project over the edge of the welt and I have therefore also provided mechanism to receive the united welt and tape after passing through the uniting mechanism and guide it and properly present it to the trimming mechanism. This mechanism is shown in detail in Figs. 13, 14, 15 and 16 of the drawings, and comprises a table 40 carried by a bracket 41 secured to the arm $A^2$. The table 40 is provided with a welt receiving groove 43 formed between a straight flange 44 along the back of the table, and the edge of the plate 45 secured to said table so that the position of its edge may be adjusted with reference to the flange 44, the arrangement being substantially like that of plate 24 on the table 16. The bottom of the groove 43 is substantially at the level of the bottom of the groove $a^4$, and said grooves are in line with each other. To hold the united welt and tape in the groove 43 and to prevent its buckling as it is fed along to the trimming mechanism by the action of the uniting rolls I have provided a covering plate 50 which is secured by a bracket 51 to the extension $b^3$ on the head B. The plate 50 is cut away at 52, and the table 40 at 46 to allow the cutters to be so located that their line of cut shall be substantially in line with the inner wall of the groove 43. The cutting or trimming mechanism may be of any suitable form, that of the machine shown in the drawings is best shown in Figs. 6 and 7 and comprises an upper rotary cutter 60 and a lower rotary cutter 61, so located that their line of cut is in the plane of the inner wall of the groove 43. The cutter 60 is mounted to rotate with a shaft 62, and the cutter 61 with a shaft 63, both of which shafts have suitable bearings in a bracket $A^5$ on the frame of the machine. The shaft 62 carrying the cutter 60 is arranged to slide longitudinally in its bearings and a spring 65 is provided which tends to hold the cutter 60 up to the cutter 61 to insure a clean cut, the arrangement being well known in cutters of this class. The shafts 62 and 63 are arranged to rotate together and in opposite directions by means of the mating gears 66 and 67 and the shaft 63 is driven by a pulley 68 which as shown is driven by an independent belt. Located adjacent to the cutters 60 and 61 is a guard 69 which is adjustably mounted on the forward end of a bracket 160, secured to the bracket $A^5$. Beneath the lower cutter 61 is supported a cup 161, which may contain oil waste for the purpose of cleaning the cutters.

It will be understood from the foregoing that the presser roll $b^1$, the tape guide $b^2$ and the covering plate 50 are all carried by the movable head B, and to cause the presser roll $b^1$ to exert the required pressure on the work and the tape guide $b^2$ and covering plate 50 to perform their functions of holding the welt in the groove $a^4$ and the united welt and tape in the groove 43, I have provided the head B with a cross-head $B^4$, to the opposite ends of which are secured the rods 70, each of which passes through an ear 71 (see Fig. 1) on the arm $A^2$. Below the ears 71 are provided the compression springs 72 which bear against said ears and against the nuts 73 screwed on to the threaded ends of the rods 70. Above the ears 71 are provided the stops 74 which, by coming in contact with the ears 71, limit the downward movement of the head B. The stops 74 are adjustable along the rods 70. The head B may be raised against the action of the springs 72, by means of a bell lever fulcrumed at 75 on the frame of the machine, and having an arm 76 which bears against the head B, and arm 77 which is connected by a rod 78 with a treadle not shown.

I have shown at 80 a belt shipper of the usual construction.

The operation of the machine of the drawings is described as follows:—The operator raises the head B by means of the treadle and inserts the reinforcing tape in the tape receiving slot of the tape guide $b^2$ and lays the welt into the welt receiving groove $a^4$ of the welt guide $a^1$, the upper surface of the welt and the lower surface of the tape having been previously coated with cement or other suitable adhesive material. He then adjusts the welt guide and tape guide so that the inner edge of the tape will be brought flush with the inner edge of the welt, and adjusts the presser roll so that its tongue 3 will engage the groove $w$ in the welt. He then brings the ends of the welt and tape into the welt receiving groove $a^2$ on the welt support $a^1$, (having conveniently previously united a small portion at the end by hand) and may, as a matter of convenience, enter them in the groove 43, the several grooves having been adjusted for the width of welt to be reinforced. He then releases the treadle and allows the head B to be brought down, bringing the lower surface of the block 30 onto the welt in the grooves $a^4$, the presser roll on to the welt and reinforcing material in the groove $a^2$, and the covering plate 50 onto the welt and reinforcing material in the groove 43. He then starts the shafts $a$ and $b$ and the rotation of the welt supporting and pressing rolls, firmly presses together and unites the welt and reinforcing tape, and at the same time feeds along the work, drawing the welt and tape from the supply and forcing the united welt and tape along the groove 43. As the welt and tape pass along the groove 43, the inner edge of the welt runs in the cutting line of the cutters, so that should any portion of the tape project, it will be trimmed off by the action of the cutters, making the inner edge of the finished product true and even.

Having thus described my invention and the operation of the preferred embodiment thereof, I claim as novel and desire to secure by Letters Patent of the United States.

1. In a welt reinforcing machine, the combination with a frame, of a welt supporting roll mounted thereon, a head pivotally mounted on said frame, a presser roll mounted on said head, means acting normally to depress the head and hold the presser roll in close proximity to the welt supporting roll, and independently adjustable means for guiding the welt and the reinforcing strip between the welt supporting roll and the presser roll in position to be united by the action thereof, substantially as described.

2. In a welt reinforcing machine, the combination with the uniting mechanism for uniting the welt and reinforcing material, of a welt guide and tape guide adjustable with reference to each other to position the tape on the welt, substantially as described.

3. In a welt reinforcing machine, the combination with a presser-roll of a welt-supporting roll having a welt-receiving groove in its working face, suitable guides for the welt and reinforcing material, trimming mechanism for trimming the reinforcing material along the edge of the welt, a grooved guide for guiding the united welt and reinforcing material to said trimming mechanism, the groove in the guide being substantially continuous with the groove in the welt-supporting roll and a covering plate for the groove in the guide, substantially as described.

4. In a welt reinforcing machine, the combination with a presser roll, of a grooved welt-supporting roll having an adjustable flange whereby the width of the groove may be varied, substantially as described.

5. In a welt reinforcing machine, the combination with a presser roll, of a welt supporting roll, having a welt receiving groove in its working face, means for guiding the welt into the groove on the welt supporting roll, and means for guiding the reinforcing strip on to the welt, substantially as described.

6. In a welt reinforcing machine, the combination with a welt supporting roll, of a presser roll having an annular rib to engage the groove in the welt, and guides relatively adjustable with reference to the presser roll to guide the welt and tape between the rolls in position to be united by the action thereof, substantially as described.

7. In a welt reinforcing machine, the combination with a presser roll, of a welt-supporting roll having a welt-receiving groove in its working face, suitable guides for the welt and reinforcing material, trimming mechanism for trimming the reinforcing material along the edge of the welt, a guide provided with a groove for guiding the united welt and reinforcing material to said mechanism, and a covering plate for said groove, substantially as described.

8. In a welt reinforcing machine, the combination with uniting mechanism for uniting the welt and reinforcing material, of trimming mechanism for trimming the reinforcing material along the edge of the welt and a guide provided with a closed channel to permit the uniting mechanism to feed the united welt and reinforcing material to the trimming mechanism, substantially as described.

9. In a welt reinforcing machine, the combination with uniting mechanism and trimming mechanism, of a grooved guide for guiding the united welt and reinforcing material from the uniting to the trimming mechanism, and a yieldingly supported covering plate for the groove in said guide to permit the uniting mechanism to feed the united welt and reinforcing material to the trimming mechanism, substantially as described.

10. In a welt reinforcing machine, the combination with uniting and trimming mechanisms, of a grooved guide for guiding the united welt and reinforcing material from the uniting to the trimming mechanism, a covering plate for the groove in said guide to permit the uniting mechanism to feed the united welt and reinforcing material to the trimming mechanism, and means for automatically varying the distance of the covering plate above the bottom of the groove according to the thickness of the united welt and reinforcing material, substantially as described.

11. In a welt reinforcing machine, the combination with uniting mechanism for uniting the welt and reinforcing material, of means for guiding the welt and the reinforcing material to the uniting mechanism with the edge of the welt overlapping the edge of the reinforcing material, substantially as described.

12. In a welt reinforcing machine, the combination with uniting mechanism for uniting the welt and a narrower strip of reinforcing material, of means for guiding the welt and reinforcing material to the uniting mechanism with one edge of the welt overlapping one edge of the reinforcing material and the other edge of the reinforcing material substantially coinciding with the inseam stitch receiving edge of the welt, substantially as described.

13. In a welt reinforcing machine, the combination with a welt supporting roll having an adjustable welt receiving groove in its working face, of a presser roll having a substantially straight working face of greater width than said groove, substantially as described.

14. In a welt reinforcing machine, the combination with uniting mechanism for uniting the welt and reinforcing material, of a guide for the welt and a guide for the reinforcing material inclined to said welt guide and adjustable relatively thereto to position the reinforcing material on the welt, substantially as described.

15. In a welt reinforcing machine, the combination with a welt supporting roll having a welt receiving groove in its working face, of a presser roll having an annular rib to engage the groove in the welt, and means for guiding the welt and the reinforcing material, substantially as described.

16. In a welt reinforcing machine, the combination, with a welt supporting roll having a welt receiving groove in its working face, of a presser roll having an annular rib to engage the groove in the welt, and means for varying the relative position of the rib and the groove, substantially as described.

In testimony whereof I affix my signature, in presence of two witnesses.

JOHN B. HADAWAY.

Witnesses:
HORACE VAN EVEREN,
ALFRED H. HILDRETH.